July 7, 1936.  P. C. GORDON  2,046,510
WARNING APPARATUS
Filed Aug. 22, 1933  3 Sheets-Sheet 1
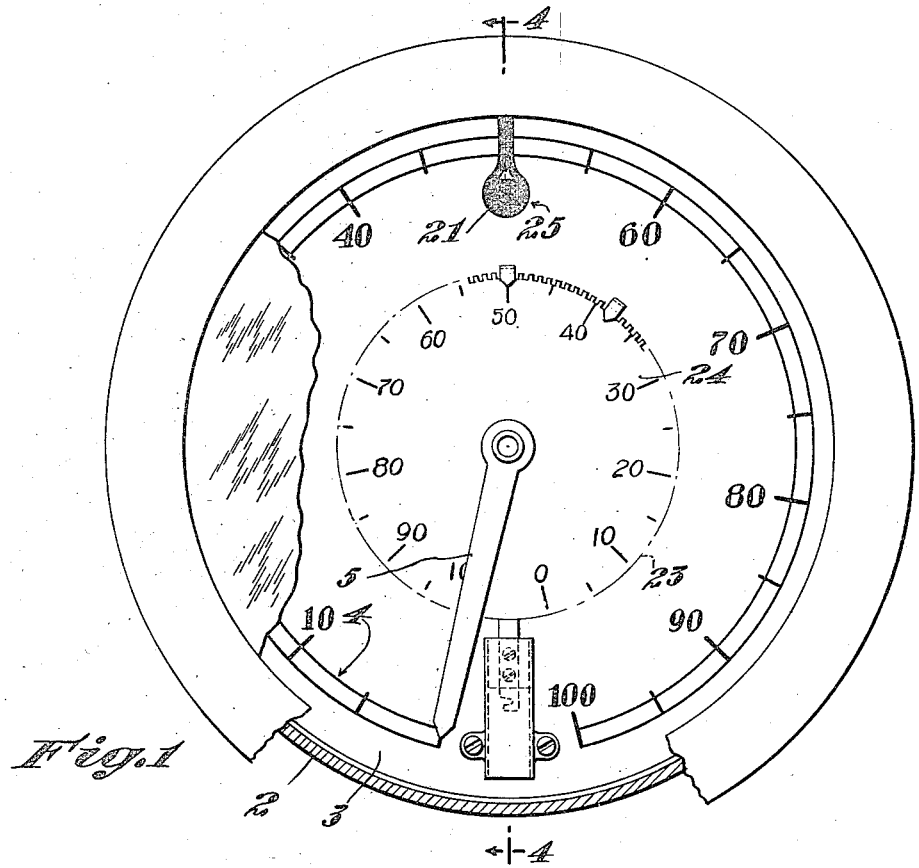
Fig. 1
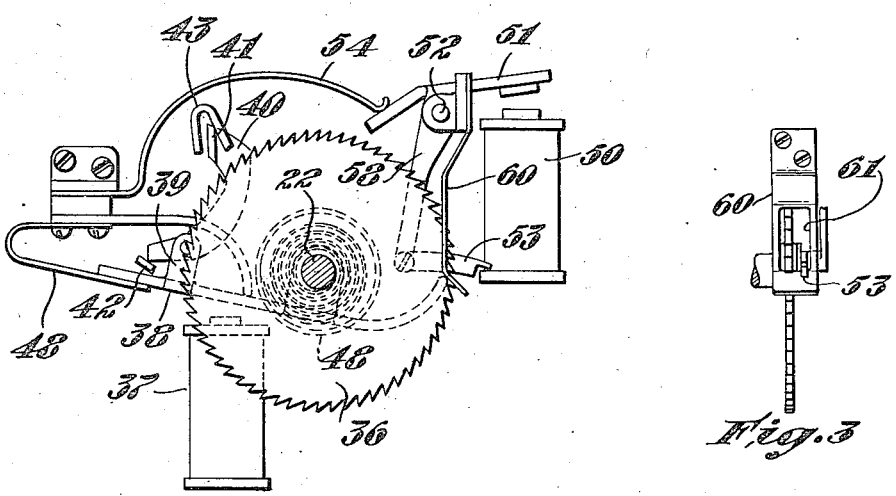
Fig. 2
Fig. 3
Inventor
Philip C. Gordon
by Roberts, Cushman & Woodbury
Attys.

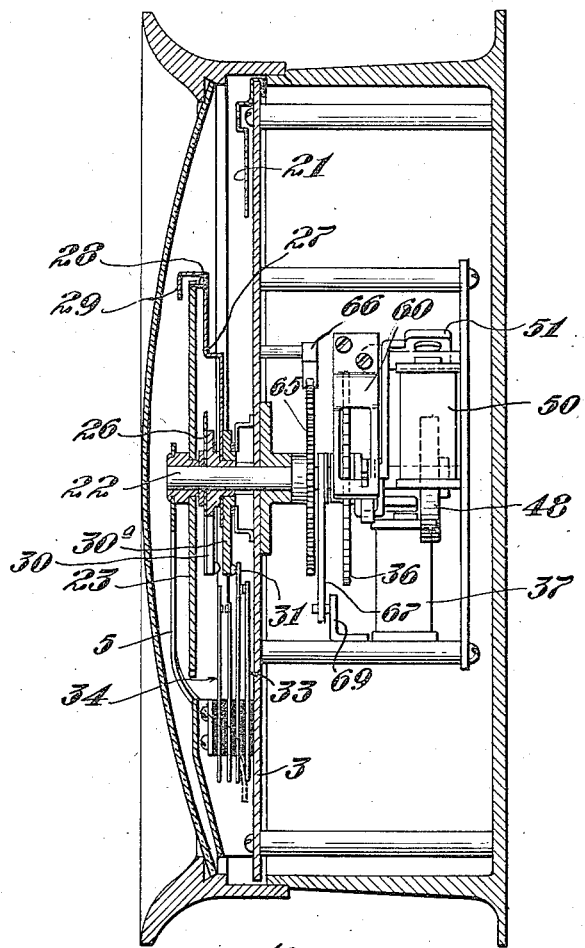
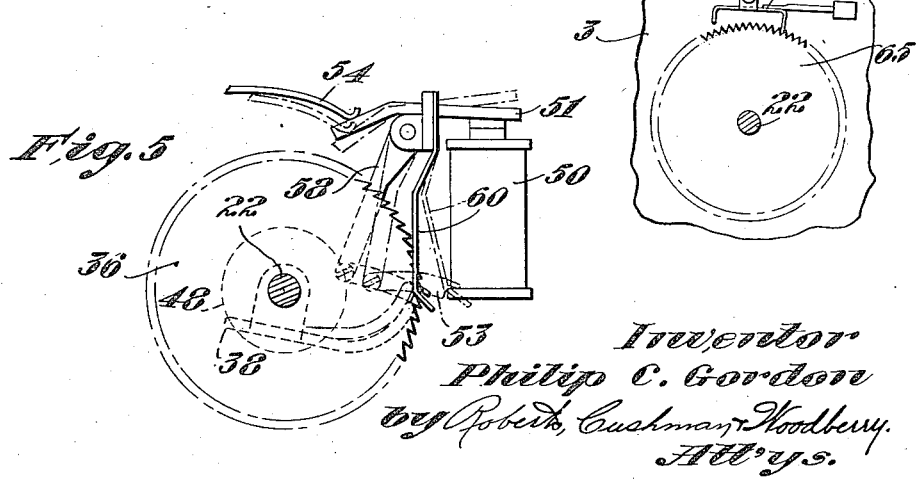

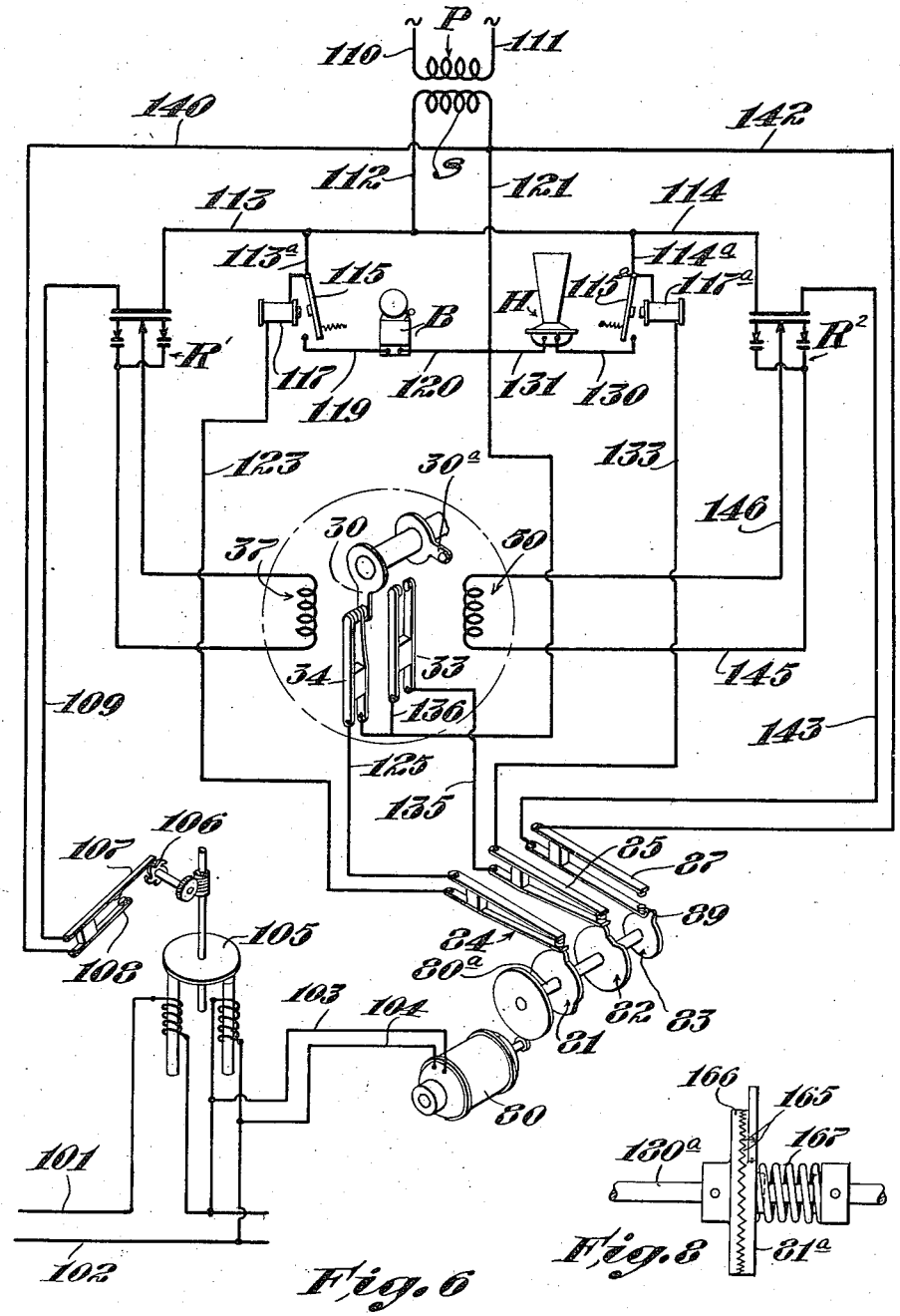

Patented July 7, 1936

2,046,510

UNITED STATES PATENT OFFICE 2,046,510

WARNING APPARATUS

Philip C. Gordon, Albany, N. Y.

Application August 22, 1933, Serial No. 686,263

3 Claims. (Cl. 177—311)

This invention relates to signaling apparatus or apparatus operated, as by the closing of an electrical circuit in response to a predetermined set of conditions determined not only by a cumulative measured factor, such as an electrical load upon a circuit, but also by a time factor, as, for example a definite period in which the cumulative factor or electrical load should not exceed a predetermined maximum.

In many localities public service corporations supplying electrical power to industrial establishments determine their rates for electrical energy in such a manner that the rate is increased to impose a penalty, if the user of the power exceeds a predetermined maximum load quota, even for a relatively short interval. Thus under ordinary conditions the total amount of electrical power in kilowatts may be measured and recorded for predetermined fifteen-minute intervals, a meter being provided to register the aggregate current consumed in each fifteen-minute period, and being provided with a pointer or the like adapted to be advanced during each fifteen-minute period when the load exceeds that of any preceding period. Accordingly, the meter reader upon visiting the plant may determine the greatest amount of energy used during any fifteen-minute period since the last meter reading. If this amount of energy used even in a single fifteen-minute period should exceed the predetermined maximum, the user of electricity may be penalized by a considerably higher cost. This system is employed by the power-supplying companies so that their peak loads may not exceed capacity, and it is obviously very much to the interest of the power user to avoid exceeding the maximum quota in any fifteen-minute or other predetermined period of time.

The specific object of the present invention is therefore to provide apparatus effective to give a warning signal, and particularly an audible signal when the amount of power consumed is exceeding a rate which, if continued for the determined interval, as a fifteen-minute period, would cause the total amount of energy consumed for the period to exceed the predetermined quota.

To permit these desirable results a wattmeter mechanism is operable in response to the load upon the power lines extending into the plan, this mechanism being effective in causing the advance of a circuit-closer toward a circuit-closing position corresponding to a condition wherein the load tends to exceed the determined quota, and a chronometrically controlled conditioning switch effective to condition the circuit for the warning signal so that it may be closed by the circuit-closer. Preferably two circuit-closers and two conditioning switches are provided in separate circuits, for example, the first circuit-closer may move to its circuit-closing position whenever the amount of electrical energy consumed exceeds one determined fraction, as ⅔ of the maximum quota, while the corresponding conditioning switch may be held in closed position for the first ⅔ of each determined period. Accordingly, the corresponding warning signal may be operated if as much as ⅔ of the predetermined maximum amount of energy is consumed within ⅔ of the determined period. The second circuit-closer and conditioning switch may be arranged to operate the corresponding warning signal nearer the end of the determined period, as for example, at the end of the fourteenth minute of a fifteen-minute period. Thus an arrangement is provided effective to give a warning under practically any working conditions when there is danger of exceeding the determined load quota.

A further aspect of this invention relates to the provision of adjustable circuit-closing means including the two circuit-closers, arranged so that they may be moved to be potentially advanceable to circuit-closing position in response to different load conditions. Mechanism is provided to cause the advancing of these members toward their respective circuit-closing positions, and to permit their return to their original starting positions in synchronized relation to the beginning of each of the predetermined intervals, as, for example, the fifteen-minute intervals referred to.

In the accompanying drawings:

Fig. 1 is a broken face view of the circuit-closer assembly or load dial assembly;

Fig. 2 is an elevational view of a part of the mechanism of the assembly shown in Fig. 1, parts being broken away and shown in section;

Fig. 3 is an elevational detail of a part of the mechanism shown in Fig. 2;

Fig. 4 is a section indicated by line 4—4 of Fig. 1;

Fig. 5 is a view similar to Fig. 2 but showing the parts in different relative positions;

Fig. 6 is a wiring diagram somewhat schematic in character; and

Fig. 7 is an elevational detail of the portion of the mechanism shown in Fig. 1; and Fig. 8 is a view of cam adjusting means which may be employed in certain installations.

In accordance with this invention, a load dial or a circuit-closer asembly may include a plurality, as for example a pair of circuit-closers, which are adjustably mounted on a rotating unit so that they may move into their respective circuit-closing positions as the unit rotates, means being provided to cause the advance movement or rotation of the unit in one direction for a fraction of a revolution in accordance with impulses received from a source of intermittent current and operating a step type driving mechanism. Preferably the rotary unit may be driven through an angular distance proportional to the load being measured by a watt-hour meter mechanism with which the circuit-closer assembly is operatively connected. A chronometric mechanism is also associated with the circuit-closer assembly and is arranged to operate reset mechanism to cause the rotary unit to return to its original starting position at predetermined intervals of time, as for example at the end of successive fifteen-minute periods, so that the advance movement of the rotary unit may then be repeated and the circuit-closers may again advance toward their circuit-closing position.

In the accompanying drawings, Fig. 1 shows a front view of the circuit-closer or load dial assembly which is provided with a substantially cylindrical outer casing 2 and with a face 3 having the form of a dial and presenting a suitable graduated scale 4. A pointer or needle 5 may move over the scale to give a visual indication of the amount of current which has been consumed in the fifteen-minute interval up to the time of reading. A suitable adjustable tab 21 may be mounted upon the periphery of the dial or face 3 and may be adjusted circumferentially of the dial to a position indicating the point at which the needle 5 may move when the amount of current being consumed reaches the maximum for the fifteen-minute period.

Mounted centrally of the housing 2 is a rotary unit comprising a shaft 22 upon which the pointer 5 is fixed. This shaft extends inwardly through the dial 3 and is operatively associated with suitable driving and reset mechanism which will be presently described. Fixed to the shaft is a notched disk 23 having suitable graduations 24 upon its margin. Loosely mounted upon the shaft 22 behind the disk 23 are a pair of collars 26. Each of these collars supports an outstanding arm 27 of resilient metal. The outer end of each arm 27 is substantially of F-shape having an outwardly extending projection 28 which normally may be engaged in one of the peripheral notches of the disk 24 and having an outer extremity 29 disposed in front of the disk 23 and forming a small pointer to register with one of the graduations upon the scale 24. The portion 29 of each arm 27 also forms a finger piece which may be pressed inwardly to effect the disengagement of the projection 28 from the disk so that the arm may be rotated in relation to the disk to bring the projection 28 into registration with another notch upon the periphery of the disk, whereupon the pressure upon finger piece or pointer portion 29 of the arm may be released and the portion 28 of the arm will again move into engagement with the disk. It is thus evident that the arms 27 may be adjusted relative to each other and to the disk to permit any desired spacing thereof, the spacing being readily observed by a reading of the scale 24. It is further evident that when the arms 27 are in their normal positions they are locked in engagement with the notched portion of the disk 23 and thus form a part of the rotary unit turning with shaft 22.

Projecting from the outer collar 26 is an extension 30, while the inner collar 26 has a similar extension 30ᵃ; these extensions 30 and 30ᵃ have cam-like protuberances 31 engageable with one arm of a circuit-closer or switch. Thus the front collar 26 has a circuit-closer 30 including a cam portion 31, movable into a position to close the switch 34 while the other collar 26 has a circuit-closer 30ᵃ to close the switch 33.

The mechanism which is located behind the dial or face 3 of the circuit-closer assembly is more particularly illustrated in Figs. 2, 3 and 5. This mechanism may be mounted upon a suitable supporting frame of the general type commonly employed in clocks and analogous instruments. The shaft 22 supports a notched wheel 36 disposed within this frame. An advancing magnet 37 is arranged adjoining the wheel 36 so that it may intermittently attract a swinging armature member 38 which is loosely mounted on the shaft 22. The member 38 has a bifurcated portion 39 upon which a swinging ratchet element 40 is pivotally mounted, this member having an end portion with a beveled edge 41 movable into and out of engagement with the toothed periphery of wheels 36', a suitable stop 42 and guide element 43 may be associated with the ratchet member 40 to maintain the same in proper position throughout its range of movement. A substantially U-shaped leaf spring 49 normally holds the swinging armature member 38 and the ratchet member 40 in the position illustrated in Fig. 2 but upon energization of magnet 37 the end of member 38, which is connected to ratchet member 40, moves toward the magnet causing the engagement of the ratchet edge 41 with the toothed periphery of wheel 36 and causing the advance step movement of the wheel in an anticlockwise direction, as viewed in Fig. 2, against action of a reset spring 48.

A reset magnet 50 is also operatively associated with wheel 36 and is provided with a swinging armature 51 mounted upon a fixed shaft 52 and normally held in its inoperative position, shown in Fig. 2, by a spring 54. Integral with the armature 51 is a depending arm 58 the lower end of which carries a pivotal mounting from which the locking member 53 projects. The end of this member is notched or rabbeted, as shown in Fig. 2, and its extremity normally occupies the position adjoining magnet 50 which is shown in Fig. 2. A spring 60 is mounted on the portion of the frame assembly which supports shaft 52 and is provided with a slot 61 (Fig. 3) through which the member 53 extends. Under normal conditions the body of member 53 rests upon the lower wall of the slot 61. The lower wall of slot 61 forms a locking element which is engageable with the successive teeth upon the periphery of wheel 36 thus to lock the latter in advanced position as it is stepped ahead by the magnet 37 and ratchet element 40; thus the locking spring 60 is effective in holding the wheel 36 against the action of the spring 48. When the reset magnet 50 is energized the armature 51 moves downwardly toward the magnet (Fig. 5) swinging the arm 58 and particularly the lower end thereof, inwardly toward shaft 22, so that the notched or rabbeted end of locking member 53 drops into engagement with the lower part of spring 60 below the slot 61. When the magnet 50 is deenergized, the spring 53 returns the armature 51 to its normal position moving the arm 58 and the lower end of spring 60 toward the right, as viewed in Fig. 5, to the position indicated in dot and dash lines, thus moving the locking portion of the spring 60 out of engagement with the toothed periphery of wheel 36, and permitting the latter to return to its normal inoperative position under the action of spring 48. When the rotary unit thus returns to its normal starting position an arm 67 on shaft 22 engages a fixed stop element 69. An escapement mechanism is provided to prevent shock and rebound under these conditions, this mechanism comprising an escapement wheel 65 secured to shaft 22 and a verge 66 pivotally mounted on the adjoining frame structure.

It is evident that the mechanism which has just been described is effective in rotating the circuit-closing members 30 and 30ª so that they may close the corresponding switches 34 and 33 as the rotary unit is advanced, due to the stepped movement of the wheel 36, and that after each advanced movement of the rotary unit for a given period, the reset magnet may be energized to cause the locking spring 60 to be held out of its normal position by the member 53, thus permitting the rotary unit, including wheel 36, to return to the normal starting position, whereupon the first energization of magnet 37 causes the end of armature member 38 to lift the locking element 53, moving it upwardly out of engagement with the lower end of locking spring 60 so that the parts are returned to the position illustrated in Fig. 1. The locking spring can then resume its normal function of locking the rotary unit against return movement under the action of spring 48.

Associated with the mechanism which has so far been described is a clock mechanism including a synchronous motor 80 which is schematically illustrated in the wiring diagram of Fig. 6, and is connected by suitable reduction gearing to a shaft 80ª which may make one revolution during each fifteen-minute period. This clock mechanism may include a dial suitably divided to indicate intervals corresponding to the fractions of the period during which the mechanism of the circuit-closer assembly completes one cycle of operations, e. g., period of fifteen minutes. The motor 80 drives suitable circuit-closing elements which as schematically illustrated in Fig. 6 may be in the form of cams 81, 82 and 83. The cam 81 may have a periphery shaped to hold the corresponding switch 84 in closed position for two-thirds of a rotation of the motor shaft. Thus if the motor shaft 80ª rotates once during a fifteen-minute period the cam 81 may hold the switch 84 in closed position for the first ten minutes of the fifteen-minute period and then permit the contacts of the switch 84 automatically to separate. A similar conditioning switch 85 may be associated with the cam 82 which has a periphery shaped to hold the switch 85 closed for a longer portion of the period of time during which the shaft 80ª makes one revolution. If, for example, this shaft makes one revolution in fifteen minutes, the cam 82 may hold its switch closed for the first fourteeen minutes of the period. The third cam 83 is provided with a small projection or rise portion 89 which may contact the switch 87 for a very short interval of time or almost instantaneously to close this switch which is connected to the reset magnet 50 of the circuit-closer assembly.

A watt-hour meter mechanism also forms a part of the apparatus included in the present invention. This assembly may be provided with any suitable driving means, receiving energy through leads 101, 102, which are provided with respective branches 103, 104 extending to the clock motor 80. Thus the rotation of the shaft 80ª and movement of cams 81, 82 and 83 is assured as long as energy is being supplied to the watt-hour meter mechanism W. The watt-hour meter is provided with a rotary portion 105 which may be of conventional form and which is driven at a speed exactly corresponding to the load being measured by the watt-hour meter. Associated with and movable at a speed relative to that of the member 105 is a circuit-closing wheel 106 which may have a plurality of protuberances engageabe with one arm 107 of a switch 108. This switch is connected by a lead 109 with a full wave rectifier R¹, the latter being connected to the advancing magnet 37. Thus repeated closings of the switch 108 result in repeated impulses passing to magnet 27 and the consequent advance movement of the rotary unit of the circuit-closer assembly. Accordingly the circuit-closing arms 30 and 30ª of the circuit-closer assembly are advanced toward their circuit-closing positions at a speed proportional to the electrical load which is effective in causing the operation of the wattmeter mechanism W.

The main source of electrical energy for this apparatus is provided by leads 110 and 111 which are connected with any suitable source of current supply such as a source of alternate current, and which may extend to one winding P of a transformer, the secondary S of which is provided with one lead 112 having branches 113 and 114 extending to the rectifier R¹ and a second rectifier R² which is associated with the reset magnet 50. A branch 113ª of the lead 113 is connected to the armature 115 of a relay assembly which includes a relay magnet 117 to which the lead 113ª is also connected. When the magnet 117 is energized the armature 115 moves to circuit-closing position, permitting current to flow from lead 113ª through a lead 119 and through the operating mechanism of a warning signal B which may be in the form of a conventional electric bell. From the latter a lead 120 extends to a return lead 121 connected to the secondary winding S of the transformer. A lead 123 extends from the magnet 117 to one side of the conditioning switch 84 and from the latter a lead 125 extends to one side of the switch 34 of the circuit-closer assembly, the opposite side of this switch being connected to the return lead 121.

A similar wiring arrangement is assoicated with the lead 114 which is provided with a branch 114ª connected to an armature member 115ª and a magnet 117ª, the armature, when attracted to the magnet, being effective in closing a circuit between the lead 114ª and a lead 130 extending to one side of an audible warning signal such as an electric horn H. A lead 131 connects the opposite side of this horn to the return lead 121. From the relay magnet 117ª a lead 133 extends to one side of conditioning switch 85, the lead 135 extending from the opposite side of this switch to the switch 33 of the circuit-closer assembly, this switch 33 being connected by a short lead 136 with the return lead 121. From lead 121 a connection 140 extends to one side of the switch 108 the opposite side of which is connected to the rectifier R¹ as has been previously described. A second branch 142 of lead 121 is connected to one side of switch 87, the opposite side of the latter being connected by a lead 143 to the rectifier R². From the latter leads 145 and 146 are connected to the reset coil 50 of the circuit-closer mechanism.

In the operation of apparatus of this character the synchronous motor 80 is driven by current received from the leads 101 and 102 extending to the watt-hour meter mechanism W, therefore as long as the main line for the electric load is in proper condition the motor 80 should receive current. At the beginning of each predetermined period, as a fifteen-minute period, the motor 80 being in rotation causes the closing of switches 84 and 85 by means of cams 81 and 82 respectively, the conditioning switch 84 remaining closed for a fraction of the period, as for example the first ten minutes of the fifteen-minute period, and the conditioning switch 85 remaining closed for a larger fraction of the period as for example the first fourteen of the fifteen minutes. In the meantime the wattmeter member 105 is rotating at a speed proportional to the load upon the main power supply lines and the switch 108 is being closed and opened in rapid succession at intervals proportional to the speed of the watt-hour meter mechanism, thus being effective in sending impulses through the rectifier $R^1$ to the advancing coil 37 which acts through the ratchet element 40 in the manner already described to rotate the rotary unit including shaft 22 and the circuit-closer arms 30 from there initial starting position. When the amount of current consumed exceeds the fraction of the predetermined total for which the corresponding circuit-closer arm 30 is set this arm moves into circuit-closing position, for example, closing switch 34. If this switch is closed before the switch 84 is opened a circuit is completed through the relay 117 which results in the movement of armature 115 to circuit-closing position and the energization of bell B and a consequent ringing of the bell to give an audible warning signal that the quota of current is being exceeded. Under ordinary operating conditions the switch 34 would not be closed in this manner until the switch 84 were opened and under these conditions the circuit for magnet 117 would remain open through the cycle of operation. When a larger fraction as 14/15 of the allotted amount of current is consumed the circuit-closer 30ª would be effective in closing switch 33 thus completing the circuit through relay magnet 117ª if the chronometrically controlled conditioning switch 84 has not already opened. When the circuit through magnet 117ª is completed the horn H is energized and a second audible warning signal is given. At the end of each fifteen-minute period the cam 83 momentarily closes switch 87 permitting current to flow from lead 142 through the switch and lead 143 to the rectifier $R^2$ whence current may pass through the reset coil 59. As previously described, the reset coil is then effective in moving the locking element 53 into engagement with the locking spring 60. When the reset coil 50 is deenergized the spring 60 is swung to the position shown in dotted lines in Fig. 5 permitting the spring 48 to reset the rotary unit to its initial starting position at the instant when the next fifteen-minute interval is starting and the cams 81 and 82 are again closing switches 84 and 85. The spring 60 will return to its normal position in engagement with wheel 36 when coil 37 is energized by the next impulse received from switch 108.

It is evident that this invention affords an arrangement permitting the energization of an audible warning signal to give notice to workers in an industrial establishment if they are using current at a rate exceeding the rate permitted by the agreement with the power supply company, so that the machines consuming the excessive current may be shut down and so that any possibility of exceeding the permitted quota may be avoided, thus avoiding liability for the excessive penalty rates that otherwise would be imposed by the power supply company. The arrangement of the disk 23 permits the adjustment of the positioning of circuit-closers 30 to conform to any desired variation in the proportional amount of current to be employed for the determined fractions of the total time interval, thus permitting adjustment to suit different load requirements and agreements. Furthermore, the pointer 5 may afford a visual indication of the amount of current being consumed so that this dial may be used for signaling means rather than or in addition to the audible signals if desired. Ordinarily, however, the audible signals are advantageous since they may afford a loud warning sufficient to call attention to the liability of exceeding the predetermined quota of current consumption under practically any working conditions.

The arrangement disclosed herein is illustrated by way of example and obviously may be varied by the use of well known expedients which are to be regarded as within the scope of the appended claims, such, for example, as the arrangement of the magnets 117ª, so that they are normally energized to hold the armature members 115 out of engagement with the contacts connected to the signals B and H, respectively. With this arrangement, when the magnets are deenergized, the arms 115 and 115ª may move to circuit-closing position under the action of gravity. For this purpose the position of the recessed and rise portions of the cams 81 and 82 may be reversed so that, for example, the switch 84 is open during the first ten minutes of the fifteen-minute period and the switch 85 is open during the first fourteen minutes of the period, the switches 34 and 33 being arranged in parallel with switches 84 and 85 and being opened rather than closed when actuated by the arms 30 and 30ª. With this arrangement current would be supplied to the magnets 115 and 115ª through either the switches 84 and 85 or through the normally closed switches 34 and 33; but if either the switch 84 or 85 were opened before the momentary opening of the corresponding parallel switch 34 or 33, the circuit to the corresponding magnet would be broken to permit the energization of the corresponding audible signal.

Obviously an arrangement of this type may be employed with the conventional safety devices such as circuit breakers. For example, a third arm, similar to the arms 30 and 30ª, might be provided on shaft 22 to close or open a switch to effect the operation of a circuit breaker, whether of the normally closed circuit or open circuit type, thus to interrupt current flow through the main power lines 101 and 102 when the load quota exceeds a determined amount within any fifteen-minute time interval. A circuit breaker may also be arranged to prevent supply of energy through leads 101 and 102 in response to a reduction in or interruption of the current in leads 110 and 111 or leads 112 and 121, thus preventing the continued employment of current received through the main power lines if there is liability of the indicating apparatus not functioning properly. Such a circuit breaker preferably may be of the manual reset type so that the attention of an attendant would be called to the interruption of current flow over the main supply lines due to the reduction or interruption of current supplied to the indicating apparatus. It is evident that an arrangement of this type is particularly advantageous, since it enables a warning signal or warning signals to give notice to the operator of the device or machine consuming the energy, such, for example, as an electric furnace, so that he can voluntarily reduce the amount of current consumption, but so that upon his failure to do this to an adequate extent the current may be definitely cut off when it reaches the maximum allotted quantity.

Fig. 8 illustrates an arrangement which may be employed to permit adjustment of one or more of the cams operated by the clock mechanism 80. In this figure the cam 81a may correspond to the cam 80 but is mounted loosely upon the shaft 180a, having teeth 165 normally engageable with teeth upon a disk 166 that is secured to the shaft 180a. A compression spring 167 normally presses the cam against the plate 166 so that the teeth upon these parts are in interlocking engagement. If it is desired to adjust the position of the cam in relation to the plate, the cam is moved away from the disk 166 and the spring 167 is compressed. The cam is then turned to the desired adjusted position and released so that the spring moves it back into engagement with the teeth of the disk.

An arrangement of this character may be advantageous in conjunction with or in addition to the adjustment for varying the responsiveness to load conditions of the apparatus which is illustrated in Figs. 1 and 4. If desired, a general arrangement of the type shown in Fig. 8 may be employed rather than the adjustable circuit closer arrangement of Figs. 1 and 4 to permit variation in the amount of electrical energy which will be effective in causing the warning signal and/or the circuit breaker to be operated.

The provision of the adjustable cam means is advantageous in certain installations and avoids the necessity for supplying new cams when changes in the conditions of current consumption develop. For example, the cam 81 is shaped to cause opening of the switch 84 at the end of a ten-minute period. If this cam is made adjustable in the manner illustrated in Fig. 8, it might be turned to a position to permit the opening of switch 84 at the end of twelve minutes. While theoretically there might be an objection that for the first two minutes of the fifteen-minute period switch 84 would be opened rather than closed when the cam had thus been adjusted, it is obvious that there is no likelihood of the maximum current quota being consumed in the first two minutes of the fifteen-minute period, and even in such a case the cam 82 is holding switch 85 closed during this first two-minute fraction of the fifteen-minute period, so that a warning signal would be given if the maximum quota were approached.

I claim:

1. Apparatus of the class described comprising a pair of electrically operable warning signals, electrical circuits effective when closed to cause operation of the respective signals, conditioning switches associated with the respective circuits, common chronometric means for holding said conditioning switches closed during different periods of time which terminate at definitely spaced intervals relative to each other, and a control circuit, a circuit-closing element for closing said control circuit, a watt-hour meter mechanism for controlling said element to cause closings of the control circuit proportional to the electrical load actuating the watt-hour meter, an advancing magnet in said control circuit energizable in response to closings of that circuit, a pair of circuit-closing members, means operated by said magnet to advance said members from a determined starting position to control said first-named circuits respectively, so that the corresponding circuit may be closed to operate the corresponding signal when the circuit-closing member is advanced to circuit-closing position while the conditioning switch is being maintained in its closed position, and reset mechanism associated with said chronometric means and circuit-closing members to cause the return of the circuit-closing members to their starting positions in synchronized relation to the beginning of the periods wherein the corresponding conditioning switches are being held in their closed positions.

2. Apparatus of the class described comprising two control circuits, short-interval and long-interval switches and circuit-closers for controlling said circuits respectively, cyclic chronometric means for opening and closing said switches during each cycle for short and long intervals respectively, and load-responsive means operatively connected to said circuit-closers to actuate the same if the load reaches predetermined low and high maxima during said intervals respectively, the low-maximum circuit-closer controlling the same circuit as the short-interval switch and the high-maximum circuit-closer controlling the same circuit as the long-interval switch whereby the condition of one circuit is altered if the load tends to exceed the predetermined maximum within the shorter interval and the condition of the other circuit is altered if the load tends to exceed the predetermined maximum within the longer interval.

3. Apparatus of the class described comprising two control circuits, cyclic chronometric means for conditioning each circuit during each cycle at intervals ending at different times, load-responsive means for altering each circuit at different times within each cycle if the load tends to exceed a predetermined maximum before the expiration of said intervals respectively, whereby the condition of one circuit is altered if the load tends to exceed the predetermined maximum before the end of one interval and the other circuit is altered if the load tends to exceed the predetermined maximum before the end of the other interval, two signalling devices, said devices being operable respectively by the circuits when thus altered.

PHILIP C. GORDON.